United States Patent [19]

Grgich et al.

[11] Patent Number: 5,807,422

[45] Date of Patent: Sep. 15, 1998

[54] DIVIDED RADIAL AND SPHERICAL DESICCANT BED ADSORPTION UNITS

[76] Inventors: George R. Grgich, 208 Loft La., Raleigh, N.C. 27609; Michael S. Cranford, 5228 Deer Chase Trail, Wake Forest, N.C. 27587; John C. Patton, 5140 Carmel Club Dr., Charlotte, N.C. 28226

[21] Appl. No.: 826,931

[22] Filed: Apr. 8, 1997

Related U.S. Application Data

[63] Continuation-in-part of Ser. No. 461,116, Jun. 5, 1995, abandoned, which is a continuation-in-part of Ser. No. 398,646, Mar. 3, 1995, Pat. No. 5,632,802.

[51] Int. Cl.$^6$ .................................................. B01D 53/26
[52] U.S. Cl. ...................... 95/10; 95/11; 95/114; 95/126; 96/111; 96/112; 96/128; 96/130; 96/133; 96/146
[58] Field of Search ............................. 55/515, DIG. 17, 55/210, 217, 274, 275; 95/10, 11, 114, 115, 117–126; 96/108, 111, 115, 121, 126–128, 130, 133, 144, 146

[56] References Cited

U.S. PATENT DOCUMENTS

| | | | |
|---|---|---|---|
| 772,551 | 10/1904 | Akeson | 55/515 X |
| 2,089,776 | 8/1937 | Wittmann | 62/129 |
| 2,214,737 | 9/1940 | Dauphinee | 183/49 |
| 2,303,333 | 12/1942 | Dauphinee | 183/4 |
| 2,519,296 | 8/1950 | Simpson | 96/126 |
| 2,535,902 | 12/1950 | Dailey | 183/4.5 |
| 2,563,042 | 8/1951 | Jaubert | 96/144 X |
| 2,588,296 | 3/1952 | Russell | 166/1 |
| 2,624,421 | 1/1953 | Savage | 183/4.3 |
| 2,626,675 | 1/1953 | Maher | 96/144 |
| 2,633,928 | 4/1953 | Chamberlain | 55/DIG. 17 |
| 2,640,558 | 6/1953 | Dauphinee | 96/133 |
| 2,699,837 | 1/1955 | Van Note | 183/4.7 |
| 2,712,981 | 7/1955 | Beggs | 23/150 |

(List continued on next page.)

FOREIGN PATENT DOCUMENTS

| | | |
|---|---|---|
| 483283 | 5/1952 | Canada . |
| 1940156 | 3/1970 | Germany ................................. 96/126 |
| 2126649 | 11/1972 | Germany . |
| 2602582 | 10/1977 | Germany . |
| 55-079027 | 6/1980 | Japan . |
| 56-152726 | 11/1981 | Japan . |
| 1551817 | 3/1990 | Russian Federation . |
| 1581357 | 3/1990 | U.S.S.R. . |
| 146397 | 6/1921 | United Kingdom . |
| 2142254 | 1/1985 | United Kingdom . |
| 2199513 | 7/1988 | United Kingdom . |

OTHER PUBLICATIONS

Pamphlet by Gas Drying, Inc.; "GDI Blower Purge Dryers;" Jan., 1992.

Pamphlet by Gas Drying, Inc.; "Compressed Air Desiccant Dryer;" Oct., 1989.

(List continued on next page.)

*Primary Examiner*—Robert Spitzer
*Attorney, Agent, or Firm*—Dougherty & Dremann

[57] ABSTRACT

A pre-compression dehydration system optimizes the gas flow parameters which are essential to the performance of a radial or spherical desiccant dryer. When used in conjunction with a low pressure dryer, the system protects the desiccant bed from channeling, which can cause the gas to flow unevenly through the desiccant bed and fail to make effective contact with the desiccant. The system provides a multiple zone, or divided, desiccant bed adsorption unit to maintain a proper flow distribution as required by the demand of the air compressor and to eliminate the potential for channeling. The system may also include a controller for automatically opening and closing the port access doors of the adsorption unit to control the amount of desiccant utilized to dry the air. A thermostatically controlled precooler may be provided for cooling the ambient air prior to adsorption to insure that the temperature of the effluent air will not exceed 100° F. (37.8° C.) as a result of the heat energy produced during the adsorption process. A heater may be provided within the desiccant bed to improve the rate of heat transfer to the desiccant media during the regeneration phase.

32 Claims, 10 Drawing Sheets

U.S. PATENT DOCUMENTS

| | | | |
|---|---|---|---|
| 2,783,547 | 3/1957 | Bieger | 34/53 |
| 2,801,707 | 8/1957 | Asker | 95/122 X |
| 2,830,672 | 4/1958 | Asker | 55/DIG. 17 |
| 3,016,978 | 1/1962 | Hull | 183/4.1 |
| 3,034,315 | 5/1962 | Coblentz | 62/272 |
| 3,091,097 | 5/1963 | Friant | 2/85 |
| 3,193,985 | 7/1965 | Siggelin | 55/33 |
| 3,204,388 | 9/1965 | Asker | 55/31 |
| 3,226,948 | 1/1966 | Alderson | 62/317 |
| 3,236,028 | 2/1966 | Rutan | 55/33 |
| 3,319,347 | 5/1967 | Bentley | 34/32 |
| 3,643,402 | 2/1972 | Wireman | 55/33 |
| 3,771,661 | 11/1973 | Barnebey | 210/240 |
| 3,850,598 | 11/1974 | Boehm | 55/387 |
| 3,880,616 | 4/1975 | Myers | 55/62 |
| 3,965,724 | 6/1976 | Ambrose | 73/64.2 |
| 4,237,696 | 12/1980 | Coblentz | 62/93 |
| 4,364,756 | 12/1982 | Clarke | 55/316 |
| 4,474,661 | 10/1984 | Nearpass | 210/437 |
| 4,589,892 | 5/1986 | Leonard | 55/162 |
| 4,658,707 | 4/1987 | Hawkins | 98/2.11 |
| 4,721,515 | 1/1988 | Hata | 55/162 |
| 4,775,484 | 10/1988 | Schmidt | 210/673 |
| 4,806,134 | 2/1989 | Lhota | 55/162 |
| 4,812,148 | 3/1989 | Hata | 55/162 |
| 4,826,516 | 5/1989 | Matsuoka | 55/388 |
| 4,863,497 | 9/1989 | Grenier | 55/181 |
| 5,037,458 | 8/1991 | Trepaud | 55/162 |
| 5,169,413 | 12/1992 | Leavitt | 55/25 |
| 5,335,426 | 8/1994 | Settlemyer | 34/80 |
| 5,378,266 | 1/1995 | Elamin | 96/114 |

OTHER PUBLICATIONS

Pamphlet by Gas Drying, Inc.; "Twin Tower Externally Heated Dessicant Aur Dryers;" May, 1991.

Pamphlet by Pneumatech, Inc.; "The Preferred Technology for Economy Regenerative Air/Gas Dryers;" Bulletin A–10EE, Section 20–2.

Pamphlet by Zurn Industries, Inc.; "Hydryer® Type P Heat Regenerative Dryers;" Form No. 310–SBG; Nov., 1991.

Pamphlet by Zurn Industries, Inc.; "PSC Heaterless Dryers;" Form No. 303–SBG; Nov., 1990.

Pamphlet by Zurn Industries, Inc.; "Heaterless Regenerative Type Compressed Air Dryers;" Form GHL; Dec., 1986.

Pamphlet by Zurn Industries, Inc.; "Gas and Liquid Dehydration and Purification Systems;" Form 401–SBG; Sep., 1990.

Pamphlet by PSB Armour, Inc.; "PSM and PSL Heaterless Dryer;" From No. 310–SBC; Jan., 1994.

Pamphlet by Zeks Air Dryer Corporation; "Hydronix™ Heat Reactivated Desiccant Dryers;" Form No. HRD–0893–10M–JRL; 1993.

Pamphlet by Zeks Air Dryer Corporation; "Hydronix™ Heatless Desiccant Dryers;" Form No. HPS–1094–10M–JRL; 1994.

Brink et al., "Mist Removal From Compressed Gases". Chemical Engineering Progress, vol. 62, No. 4, pp. 60–65 (1966).

Pamphlet by Atlantic Research Corporation; "Desiccant Type Desomatic Adsorption Dryers for Compressed Air, Gases, Liquids, and Process Streams;" Sep., 1967.

Pamphlet by Ingersoll–Rand; "Thermal Mass Air Dryers for Desert Dry Compressed Air;" May, 1972.

Pamphlet by Bry–Air; "MVB Engineering and Application Data Manual;" Mar., 1995.

Contact Time Profile Comparison

DIVIDED RADIAL AND SPHERICAL DESICCANT BED ADSORPTION UNITS

CROSS REFERENCE TO RELATED APPLICATION

This application is a continuation-in-part of U.S. patent application Ser. No. 08/461,116, filed Jun. 5, 1995, now abandoned, which is a continuation-in-part of U.S. patent application Ser. No. 08/398,646, filed Mar. 3, 1995, now U.S. Pat. No. 5,632,802.

FIELD OF THE INVENTION

The present invention relates generally to an improved gas-dehydration system, and more particularly, to a method and apparatus for providing an even flow of atmospheric air through a desiccant bed adsorption unit to dry the air prior to compression in an air compressor.

BACKGROUND OF THE INVENTION

In current compressed air systems, drying equipment is required to remove moisture from the air to improve the quality of the air before it is used by equipment or machinery that requires compressed air to operate. Because of the limitations of current designs, compressed air is dried after passing it through the compressor, as it has not been economical or energy efficient to dry the air at atmospheric pressure before it is compressed.

A good understanding of the basics of adsorption is necessary to appreciate the advantages of the invention. The first step in creating a desiccant based dehydration unit is to calculate the amount of water that the unit will be required to adsorb during a given length of time. This is accomplished by multiplying the volumetric gas flow rate by the length of time of operation of the unit. The resulting volume of gas must then be corrected for pressure by multiplying the total volume of gas by a pressure correction ratio of absolute barometric pressure divided by the absolute pressure. To determine the amount of water in the corrected volume of gas, the saturation level of the gas in grains of $H_2O$ per volume of gas must be estimated. In most instances, air that has been compressed and passed through an aftercooler is 100% saturated at approximately 100° F. (37.8° C.), which is equivalent to 19.96 grains of $H_2O$ per cubic foot of air. Saturation levels less than 100% at various temperatures are available from well known saturation tables. The corrected volume of gas is then multiplied by the moisture level to determine the number of grains of $H_2O$ in the corrected volume of gas. This value can be converted to pounds of $H_2O$ by dividing the result by 7000 grains $H_2O$/lb $H_2O$.

Once the amount of water that the unit has to remove is known, it is necessary to calculate the quantity of desiccant that is required to adsorb this amount of water. Solid desiccants such as activated aluminas, silica gels and molecular sieves have adsorptive capacities defined as the percentage of water that they can adsorb compared to their own mass (lbs $H_2O$/lbs desiccant). For example, these desiccants can typically adsorb as much as 40% of their own weight of water in a static state. Predicting the dynamic capacity for specific adsorption, however, has previously been considered to be a matter of testing, experience, hypothesizing or a combination of all of the above.

What has been discovered is that the lower the velocity of the gas, the closer the dynamic capacity is to the static capacity of the desiccant. For typical compressed air systems operating at 114.7 psia (8064.2 g/cm²a), a dynamic capacity of approximately 15% is used to size the desiccant beds, assuming an axial gas flow and a linear gas velocity of 50–60 ft/min is maintained. As the linear gas velocity through the desiccant bed is lowered, the dynamic capacity of the desiccant is increased because the time that the gas is in contact with the adsorbent is increased. Unfortunately, data is not available from desiccant manufacturers to determine the actual impact of lowering the linear gas velocity because it has been previously uneconomical for air dryer manufacturers to attempt to lower desiccant bed velocities using conventional axial flow bed configurations. Slowing the gas velocity necessarily requires a larger pressure vessel, and the use of larger quantities of desiccant to satisfy the dynamic parameters required to operate the system. Thus, larger amounts of energy must be expended in regeneration, thereby making such a system less competitive.

Once a dynamic capacity for the configuration has been predicted, the desiccant quantity may be calculated by dividing the amount of $H_2O$ in the connected volume of gas previously determined, by the dynamic capacity expressed as a percentage. In compressed air systems this value is normally acceptable, and no other calculations are required to define the mass of desiccant required to adsorb the calculated amount of water. In instances where the gas is at a low pressure, determining the optimum configuration for bed sizing becomes somewhat of an art.

When the gas is flowing through a desiccant bed at low pressure, the equivalent linear bed velocity becomes much higher, thus reducing the amount of time the gas is in contact with the desiccant. The contact time between the desiccant and the gas is one of the significant parameters affecting the performance of the unit, especially at low pressure. Current technology utilizing axial flow, stacked desiccant beds are inefficient for this reason. To effectively lower the equivalent bed velocity in an axial configuration, the opposing surface area that the desiccant occupies must be large enough to disperse the volume of gas to obtain an adequate contact time for effective adsorption. By the nature of the geometry, the resulting bed becomes a cylindrical, large diameter vessel that is short in its height dimension. The equivalent bed velocity is calculated by dividing the gas flow velocity by the quantity obtained by dividing the absolute gas pressure by the atmospheric pressure, and multiplying the result by the opposing surface area. For effective dehydration, gas velocities should be held to well below 50 ft/min (15.2 M/min), and a minimum contact time of at least 2 seconds should be maintained.

It is important that the desiccant bed is sized deep enough to produce an adequate pressure drop to prevent the gas from channeling through the desiccant bed. The engineered superficial mass flow must be great enough to incur a pressure drop of at least 0.01 psi per foot (21.4 g/cm² per cm) of desiccant bed to prevent channeling. Channeling should be avoided because it significantly reduces contact of the incoming air with the desiccant media. Consideration of these configuration criteria, along with the significant surface area required to achieve adequate contact time, results in axial bed designs that are large and uneconomical for drying air at low pressure.

The mathematical equations for calculating pressure drop through desiccant beds are complex. The equations discussed below illustrate the calculations involved in determining the pressure drop of a gas flow through a desiccant bed. The following form of the Ergun equation is satisfactory for estimating the pressure drop in gas and liquid streams flowing through spherical desiccants:

$$-\Delta P = (6.94 \times 10 - 3 \times F \times L \times G^2)/(p \times K)$$

Where:

F=Dimensionless friction factor;

L=Bed depth, ft;

G=Superficial mass flow, lbs/hr-ft$^2$;

p=Stream density, lbs/ft$^3$; and

K=Empirical constant for the product, hr$^2$/ft$^2$.

The first step in calculating the pressure drop is to determine p, the stream density. The density of a gas at a specific pressure and temperature is calculated by the equation:

$$p=(MW/379 \text{ ft}^3/\text{lb mol})\times(P/14.7 \text{ psia}\times(520° \text{ R.}/(460° \text{ R.}+T))$$

Where:

MW=Molecular weight of gas, lbs/lb mol;

P=Gas pressure, psia; and

T=Gas temperature, °R.

The superficial mass flow G is calculated by the equation:

$$G=S\times 60 \text{ min}\times(MW/379 \text{ ft}^3/\text{lb mol})\times(1/A)$$

Where:

S=Volumetric gas flow, ft$^3$/min;

MW=Molecular weight of gas, lb/lb mol; and

A=Bed surface area, ft$^2$.

The viscosity of the fluid in centipoise may be found by reference to commonly used tables. Particle diameter in feet Dp is determined from Table 1 below based on the nominal desiccant ball size. Viscosity and particle diameter are then used to calculate the Reynolds Number according to the following equation:

$$Re=(Dp\times G)/(2.42 \text{ lbs/hr-ft}\times n)$$

Where:

Dp=Particle diameter, ft;

G=Superficial mass flow, lbs/hr-ft$^2$; and n=Stream viscosity, centipoise.

Once the Reynolds Number has been determined, it can be used to find F, the friction factor. This will be illustrated numerically for simplicity. The friction factor is determined numerically by matching the Reynolds Number value with the following equations for the friction factor.

TABLE 1

| | |
|---|---|
| if .18 < Re ≦ 4 | then F = 1.502102 × Re (−1.010692) |
| if 4 < Re ≦ 20 | then F = 1.215547 × Re (−.858004) |
| if 20 < Re ≦ 60 | then F = .505125 × Re (−.56487273) |
| if 60 < Re ≦ 200 | then F = .185592 × Re (−.320326) |
| if 200 < Re ≦ 1000 | then F = .179812 × Re (−.314355) |
| if 1000 < Re ≦ 10000 | then F = .085209 × Re (−.206244) |

The remaining variables in the Ergun equation are K, the empirical constant for the desiccant expressed in hr$^2$/ft$^2$ and L, the bed depth expressed in feet. The value of K can be found in Table 2 below. The value of K corresponds to the desiccants nominal size. The value of L, is selected by the engineer.

TABLE 2

| Nominal ball size, in. | Dp inch | Dp feet | Dp cm | M | K factor |
|---|---|---|---|---|---|
| 7 × 14 mesh | .08 | .0065 | .20 | .002 | 2.7 × 10$^3$ |
| ⅛ | .13 | .0108 | .33 | .003 | 5.2 × 10$^3$ |
| 3⁄16 | .19 | .0158 | .48 | .005 | 8.6 × 10$^3$ |
| ¼ | .23 | .0192 | .58 | .006 | 1.2 × 10$^4$ |
| ½ | .50 | .0417 | 1.27 | .013 | 4.3 × 10$^4$ |

The step of determining the bed pressure drop is then accomplished by substituting the variables described above into the Ergun equation for pressure drop, ΔP.

The final consideration is the rise in gas temperature caused by adsorption. In an axial bed design, a gas flowing through a desiccant bed at a pressure of 100 psig (7030.7 g/cm$^2$a) and saturated at 100° F. (37.8° C.) should experience a gas temperature rise of approximately 25° F. (13.9° C.). This temperature rise is caused by the heat of adsorption that occurs in the mass transfer zone during adsorption. The mass transfer zone is the portion of the desiccant bed that adsorbs the bulk of the water from the gas. This zone moves dynamically in the direction of the gas flow as the desiccant becomes sequentially saturated, or reaches its equilibrium capacity. The thickness of this zone and the amount of heat that is created is dependent on the geometry of the bed and the gas flow characteristics. In an axial stacked bed, the temperature rise is small when the gas is at 100 psig (7030.7 g/cm$^2$a) because the volume of the air has been compressed and the pounds of water per cubic foot of compressed air is less than if the air were compressed to only 50 psig (3515.4 g/cm$^2$g). In an axial bed design, a gas flowing through a desiccant bed at a pressure of 50 psig (3515.4 g/cm$^2$g) and saturated at 100° F. (37.8° C.) should experience a gas temperature rise of approximately 45° F. (25° C.). This effect causes a dramatic decrease in performance because desiccants do not adsorb moisture efficiently at temperatures greater than 130° F. (54.4° C.). Desiccants behave as insulators because they are typically made from ceramics and silicas. The insulating qualities of desiccants lessen internal heat dissipation and contribute to dramatic temperature rises. The engineer must consider this phenomenon when designing an adsorption unit at low pressure because the bed must be configured to allow for enough surface area to spread the mass transfer zone thinly, and to reduce the heat rise from adsorption. This is the single biggest hurdle in designing axial desiccant bed configurations for low pressure adsorption. The necessary surface area expands the diameter of the vessel and the depth of the bed must be increased to produce enough pressure drop to prevent channeling, thus making the unit that much less economical to manufacture and operate.

Another effect relating to adsorption gas temperature rise to be considered is its effect on the density of the gas. Gases occupy greater volume at higher temperatures, and thus are less dense. For example, one cubic foot (1 ft$^3$) of air weighs less at 100° F. (37.8° C.) than at 50° F. (10° C.). This difference in density is important to the efficiency of the compressor. Air compressors are rated to deliver a measured mass flow based on "standard" inlet conditions of the ambient air to be compressed. As the temperature of the ambient air drawn into the compressor rises, the compressor pulls in less mass per minute of air. Obviously, the standards used to rate air compressors are irrelevant because ambient air conditions vary from place to place, and at different times of the day. It is important that the Presorber not produce effluent temperatures in excess of 100° F. (37.8° C.) to maintain compressor efficiency. An air conditioning system to the inlet of the Presorber that is designed to maintain an inlet drybulb and wetbulb temperature not to exceed 55° F. (12.7° C.) to the adsorbing desiccant bed will insure a gas temperature rise of less than 45° F. (7.2° C.). This will maintain an effluent drybulb temperature of approximately 100° F. (37.8° C.) exiting the Presorber and entering the compressor.

Once the desiccant bed has become saturated, it can no longer adsorb water vapor, and must be regenerated. The calculations for regenerating desiccant are fairly straight forward. Desiccant manufacturers typically publish isosteres to assist engineers to calculate the temperatures necessary to adequately regenerate a particular desiccant. These isosteres are based on "wet gas" regeneration, and relate the final bed regeneration temperature necessary to achieve a required effluent dewpoint based on the adsorption gas temperature and the dewpoint of the regeneration gas. Once these values are determined, the engineer can use well known heat transfer calculations to determine the amount of energy necessary to regenerate the desiccant, as well as the volumetric flow rate necessary to deliver this energy to the desiccant bed.

The amount of energy required to achieve regeneration of desiccant varies based on its chemical composition. For activated alumina, the heat of desorption of water is 1600 BTU/lb $H_2O$ (889 gram-calorie/gram). It is important to note however that these values are based on a wet source of regeneration gas, where regeneration relies predominately on the convection heating of the desiccant and the expansion of the gas from heating to break the polar bond between the water and the desiccant. If a dry source of gas is used, the regeneration temperatures may be lowered because greater vapor pressure differential between the regeneration gas and the desiccant is sufficient to assist in the regeneration of the desiccant.

There is no published information available from the desiccant manufacturers that is based on dry gas regeneration. Accordingly, those skilled in the art have had to determine these regeneration temperature limits through trial and error. The heat capacity of activated alumina is 0.22 BTU/lb-°F. (0.22 gram-calorie/gram per °C.).

The amount of time available for regeneration factors into the equation for determining the required volumetric flow for regeneration. To determine the total amount of energy necessary to regenerate the desiccant, one must add the amount of energy required to heat the mass of desiccant to the energy needed to desorb the water from the desiccant, while factoring in heat losses. The total amount of energy needed to regenerate the desiccant, combined with the volume of gas necessary to deliver the required energy, will determine the total energy in Kilowatts necessary to regenerate the desiccant bed.

DESCRIPTION OF RELATED ART

Applicant is aware of the following printed publications relating to methods and apparatus for drying air for use with a compressor.

| U.S. Pat. No. | Issue Date | Inventor | Title |
| --- | --- | --- | --- |
| 4,474,661 | 10-02-1984 | Nearpass | FILTER DRYER |
| 4,775,484 | 10-04-1988 | Schmidt | METHOD AND APPARATUS FOR THE CONTINUOUS SEPARATION OF CONTAMINANTS FROM A FLUID MIXTURE |
| 4,863,497 | 09-05-1989 | Grenier | OZONE-PRODUCING PLANT |
| 5,037,458 | 08-06-1991 | Trepaud | APPARATUS FOR REGENERATING AN ADSORBER IN A GAS DRYING PLANT |
| 5,169,413 | 12-08-1992 | Leavitt | LOW TEMPERATURE PRESSURE SWING ADSORPTION WITH REFRIGERATION |
| 5,335,426 | 08-09-1994 | Settlemyer | METHOD AND APPARATUS FOR THERMAL REGENERATION OF MOLECULAR SIEVE MATERIAL USED IN OXYGEN CONCENTRATIONS |
| 5,378,266 | 01-03-1995 | Elamin | AIR DRYER SYSTEM |

Nearpass, U.S. Pat. No. 4,474,661, discloses a filter dryer for refrigeration systems which includes a generally tubular molded desiccant core. The central opening of the core is sealed, and one end of the core is supported by a forced-in plastic ball that is retained in a seat dimpled in the inlet baffle.

Schmidt, U.S. Pat. No. 4,775,484, discloses a method and apparatus for the separation of components combined in a fluid mixture. FIGS. 7, 8, and 9 show radial-flow chambers that are used and regenerated sequentially by means of a carousel support.

Grenier, U.S. Pat. No. 4,863,497, discloses an ozone-producing apparatus in which oxygen circulating in an ionization loop is partly ozonized, and then the ozone is trapped by adsorption and desorbed by a substitution gas. The apparatus includes a plurality of radial-flow desiccant beds that are sequentially used and regenerated by selectively feeding the desiccant beds.

Trepaud, U.S. Pat. No. 5,037,458, discloses a method of regenerating adsorbers in a gas drying plant, notably a plant for drying compressed air, and an apparatus for carrying out the method. The apparatus includes a pair of adsorbers wherein one adsorber performs the adsorbing function while the other is regenerating.

Leavitt, U.S. Pat. No. 5,169,413, discloses pressure swing adsorption gas separation operations that are enhanced by the retention and use of internal refrigeration effects, without the need for externally supplied refrigeration. The adsorber beds are fed selectively, and the flow through the beds may be radial (see column 9, line 48).

Settlemyer, U.S. Pat. No. 5,335,426, discloses a method and apparatus for regenerating molecular sieve material using a combination of heat and dry sweep gas. The system also employs two drying chambers containing a desiccant material. The active drying chamber adsorbs moisture while the inactive chamber sends a sweep gas through the desiccant material to remove the adsorbed moisture.

Elamin, U.S. Pat. No. 5,378,266, discloses an adsorption system in which a separate purge volume intermittently purges the desiccant when the compressor goes off load. In the alternative, the purge volume is replaced by a second desiccant cartridge and the two desiccant cartridges are alternatively purged and used to dry the compressed air.

SUMMARY OF THE INVENTION

The present invention is a desiccant adsorption unit which maintains the essential gas flow parameters which are important to the optimum performance of a radial or spherical desiccant dryer. In low pressure dryers, an important consideration is to prevent the gas flow in the desiccant bed from channeling. When channeling occurs, the gas does not flow uniformly through the desiccant bed, thus making ineffective contact with the desiccant, which results in air that is not completely dried. To guard against channeling, the desiccant bed adsorption unit must maintain a pressure drop of no less than 0.01 psi per foot (21.4 g/cm$^2$ per cm) of bed depth. If the pressure drop is less than 0.01 psi per foot (21.4 g/cm$^2$ per cm), there is the potential for the gas to channel through the desiccant bed. Because the demand for air to be dried by the desiccant bed adsorption unit varies with the operational demand of the air compressor, there are times when the volumetric flow rate through an adsorption bed may be low enough that the pressure drop is less than the desired pressure drop threshold of 0.01 psi per foot (21.4 g/cm$^2$ per cm). The present invention provides a multiple zone, or divided, desiccant bed, which maintains a proper flow distribution as required by the demand of the air compressor, and thus reduces the opportunity for channeling. The desiccant bed units may be configured for either radial or spherical air flow.

A divided radial desiccant bed adsorption unit contains a bed of desiccant media held in place by a tubular outer screen and a tubular inner screen which together form a tubular desiccant segment. Spaced radically outwardly from the outer screen is a desiccant housing. A barrier extending from the desiccant housing through the outer screen and to the inner screen divides the tubular desiccant segment into a first tubular desiccant segment (also referred to as a first zone) and a second tubular desiccant segment (also referred to as a second zone). The tubular inner screen defines a center chamber which is in communication with an air compression machine. The top surface and the bottom surface of the desiccant housing contact the top and bottom, respectively, of the tubular desiccant bed media. Each of the first zone and the second zone has a sealable air inlet port.

A divided spherical desiccant bed adsorption unit contains a bed of desiccant media held in place by a spherical outer screen and a spherical inner screen which together form a spherical desiccant segment. The resulting spherical desiccant bed adsorption unit has a first hemisphere and a second hemisphere, a spherical center chamber and a tubular channel in communication with the center chamber. The spherical desiccant bed adsorption unit is housed in a container. The container top and container bottom are spaced from the spherical desiccant bed media, and the side of the container is also spaced from the spherical desiccant bed adsorption unit. A solid divider extends from the outside surface of the container to the inside screen of the spherical desiccant bed adsorption unit adjacent the center chamber forming a first zone, a second zone and a sealable air inlet port in each zone.

The unit may also include an air conditioner, or precooler, for cooling the ambient air prior to adsorption. The precooler is thermostatically controlled to cool the ambient air to maintain an inlet drybulb and wetbulb temperature not to exceed 55° F. (12.7° C.) to the adsorbing desiccant bed. The precooler insures that the temperature of the effluent air will not exceed 100° F. (37.8° C.) as a result of the heat energy produced during the adsorption process. The precooler operates only when the ambient drybulb temperature exceeds 55° F. (12.7° C.).

OBJECTS OF THE INVENTION

The principal object of the present invention is to provide an improved method of drying atmospheric air prior to compression in a compressor.

Another object of the invention is to provide an apparatus for drying atmospheric air that will ensure an even flow of air through the adsorber desiccant beds, and thereby eliminate the potential for air channeling through the desiccant when the demand for air by a compressor is less than 100%.

Another object of the invention is to provide an apparatus for drying atmospheric air in which a desiccant bed maintains improved flow distribution at low demand levels.

Another object of the invention is to provide an apparatus for cooling atmospheric air prior to adsorption to insure that the temperature of the effluent air will not exceed 100° F. (37.8° C.) as a result of the heat energy produced during the adsorption process.

BRIEF DESCRIPTION OF THE DRAWINGS

The foregoing and other objects will become more readily apparent by referring to the following detailed description and the appended drawings, in which.

DETAILED DESCRIPTION OF THE PREFERRED EMBODIMENTS

Figure 1:
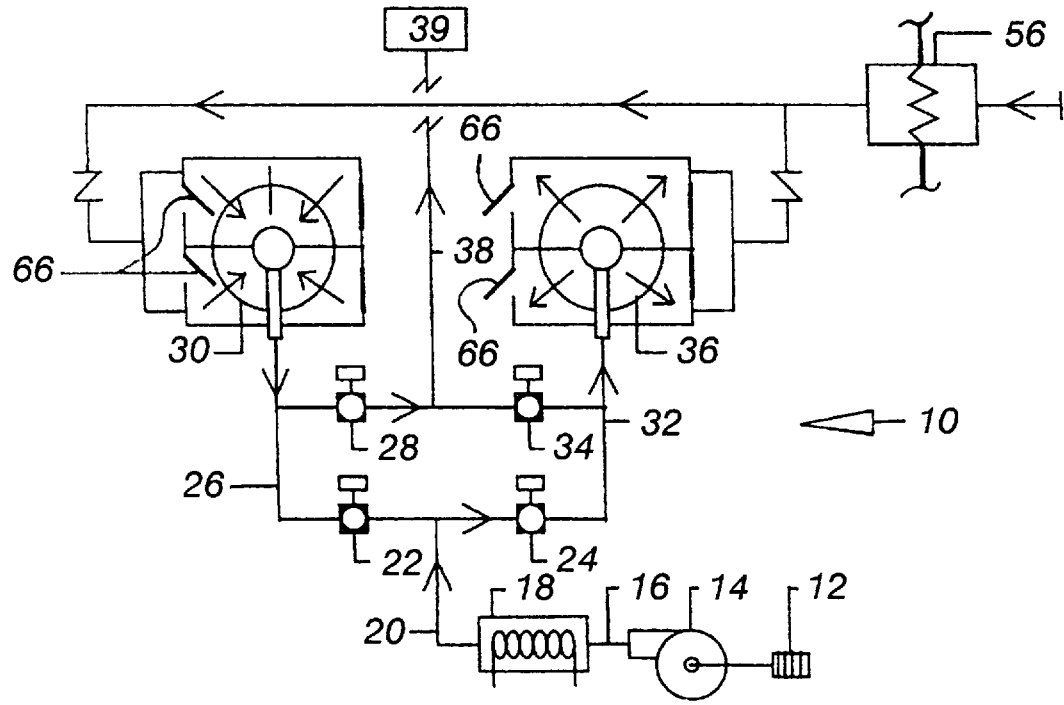
FIG. 1 is a schematic diagram of a pre-compression gas dehydration system including a pair of desiccant bed adsorption units.

Referring now to the drawings, a pre-compression dehydration system 10, shown in FIG. 1, includes an air filter 12, which communicates with and filters incoming air to a blower 14. A first conduit 16 connects blower 14 and a heater 18, the outlet of which is coupled to a second conduit 20. The second conduit 20 is connected to a first valve 22 and to a second valve 24. A third conduit 26 is coupled to and in communication with the first valve 22, a third valve 28 and a first desiccant bed absorption unit 30. A fourth conduit 32 is coupled to and in communication with the second valve 24, a fourth valve 34, and a second desiccant bed absorption unit 36. A fifth conduit 38 is coupled to and in communication with the third valve 28, the fourth valve 34, and a gas compressor 39, such as a conventional air compressor.

Figure 4:
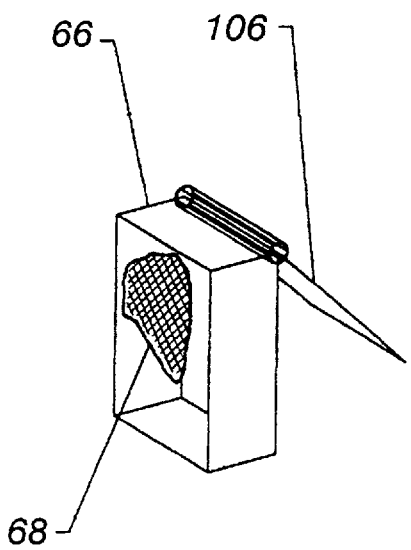
FIG. 4 is an enlarged perspective view of the air inlet port of the spherical desiccant bed of FIG. 2.

In the fully automatic mode, the system illustrated in FIG. 1 includes all the necessary controls, valves, heater, and blower to support the drying function of the radial or spherical adsorber desiccant beds. These controls may be connected to a computer having a central processor which can be programmed to operate the entire system automatically. In response to sensor data or programmed input, the port access doors (FIG. 4) are opened or closed to control the amount of desiccant utilized by the system.

Figure 2:
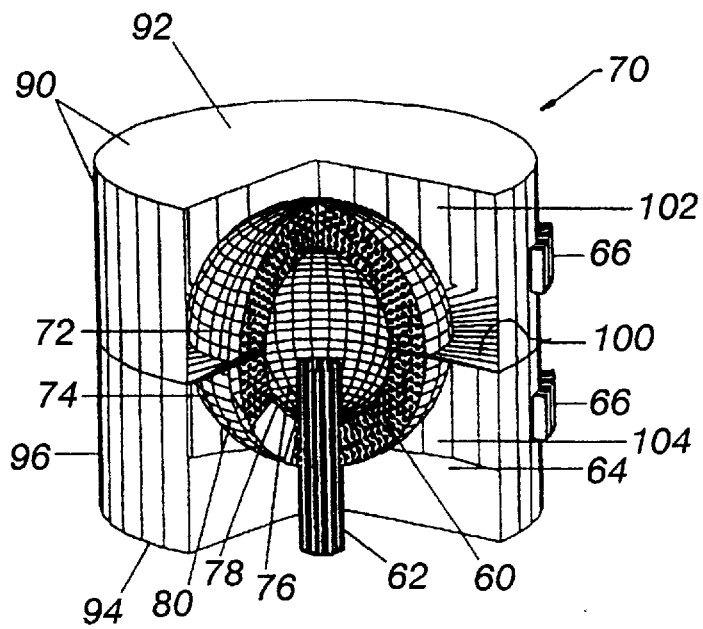
FIG. 2 is a partial cutaway view of a spherical desiccant bed adsorption unit according to the system of FIG. 1 having a solid divider between segments of the adsorption unit.
Figure 3:
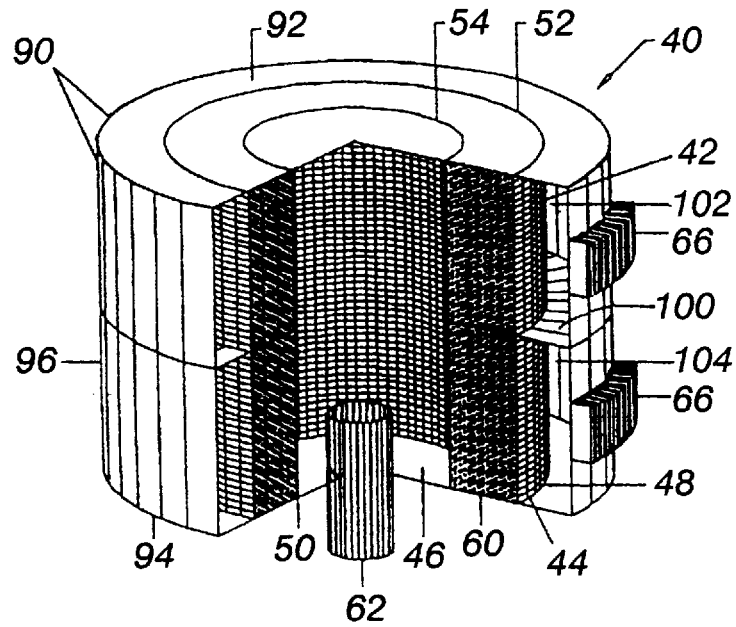
FIG. 3 is a partial cutaway view of a radial desiccant bed adsorption unit according to the system of FIG. 1 having a solid divider between segments of the adsorption unit.

U.S. patent application Ser. No. 08/461,116 filed Jun. 5, 1995, and assigned to the assignee of the present invention, the disclosure of which is expressly incorporated herein, discloses a pre-compression gas dehydration system using a single zone adsorber desiccant bed. The adsorptive desiccant bed media 60, is preferably configured in a spherical pattern as shown in FIG. 2, but may also be configured in a radial pattern as shown in FIG. 3. It should be noted that other geometric configurations of desiccant beds may be used. The configuration of the adsorber desiccant bed is material to the performance of the dryer because it determines the surface area available for the air flow through the desiccant media.

Increased surface area increases the contact time with the desiccant that the air experiences as it flows through the desiccant bed. Water vapor that is entrained in the air flow is adsorbed by the desiccant media 60 during the time that the air flows through the desiccant bed. The geometric shape of the spherical bed adsorber allows this system 10 to achieve a minimum of 2 seconds air flow contact time as the air flows in a radial direction through the radial or spherical desiccant bed. Thus, the dewpoint of the air is reduced before it enters the inlet of the gas compressor. The dewpoints produced by the dryer result in dewpoints at pressure after compression which meet or exceed the capabilities of current drying systems for compressed air.

As shown in FIGS. 2 and 3, desiccant media 60 is preferably housed in a cylindrical container 90 having a top, a bottom and a continuous side. The container 90 includes at least one air inlet port 66 (FIG. 4) which is fitted with a flow vent filter 68 and an adsorption door 106. The air inlet port can be placed either in the top, bottom or side of the cylindrical vessel, and is preferably placed in a gap zone 64. Gap zone 64 is an area between the side 96 of the container 90 and the desiccant media 60 which allows the air to flow freely all around the outside of the desiccant bed.

The desiccant media 60 may be selected from, but is not limited to, the group consisting of activated aluminum trioxide ($Al_2O_3$), molecular sieve, silica gel, lithium chloride (LiCl) and combinations thereof. An example of a possible combination is aluminum trioxide and silica gel desiccant media sold under the trademark SORBEAD™ by Solvay Performance Chemicals, Inc., of Greenwich, Conn. The desiccant media 60 adsorbs moisture which results in dry intake air entering the gas compressor 39.

To obtain the gas flow parameters which are essential to the performance of a radial or spherical desiccant bed dryer, one important consideration is to protect the desiccant bed from channeling. When designing dryers which experience a low pressure draw, this consideration becomes even more important. When channeling occurs, the gas does not flow uniformly through the desiccant bed. Nonuniform airflow results in ineffective contact with the desiccant, and thus fails to completely dry the air. To guard against channeling, the desiccant bed adsorption unit must ideally maintain a pressure drop of at least 0.01 psi per foot (21.4 $g/cm^2$ per cm) of bed depth. If the pressure drop is less than 0.01 psi per foot (21.4 $g/cm^2$ per cm) of bed depth, the potential exists for the gas to channel through the desiccant bed. Because the demand for air to be dried by the desiccant bed adsorption unit varies with the demand of the compressor, there will be times when the volumetric flow rate through the radial or spherical desiccant beds may be so low that the actual pressure drop falls below the pressure drop threshold of 0.01 psi per foot (21.4 $g/cm^2$ per cm) of bed depth. The present invention provides a multiple, or divided, zone desiccant bed to maintain the flow distribution required by the demand of the compressor, thus substantially reducing the opportunity for channeling to occur.

The divided radial desiccant bed adsorption unit 40, illustrated in FIG. 3, contains a radially configured desiccant bed media 60 held in place by a tubular outer screen 48 and a tubular inner screen 50 which together form a first annular segment 44. A second annular segment 42 is formed by a second tubular outer screen 52 and a second tubular inner screen 54. A tubular center channel 62 communicates with and extends into a hollow center chamber 46. The radial desiccant bed adsorption unit 40 is housed in the cylindrical container 90. The top surface 92 and bottom surface 94 of container 90 contact the top and bottom of the radial desiccant bed media 60 and close the continuous side 96 of the container 90. The side 96 is spaced radially outwardly from the radial desiccant bed media 60. A solid segment divider 100 extends from the continuous outside surface 96 of the container 90 to the center chamber 46, thereby forming a first zone 102 and a second zone 104. A sealable air inlet port 66 (FIG. 4) is provided in each zone. The first zone 102 and the second zone 104 are preferably equally sized, but may be sized in any proportion to alleviate channeling in the unit 40.

The divided spherical desiccant bed adsorption unit 70, illustrated in FIG. 2, contains a spherically configured desiccant adsorption bed media 60 held in place by a spherical inner screen 78 and a spherical outer screen 80. A solid segment divider 100 forms a first hemispherical segment 72 and a second hemispherical segment 74. Tubular center channel 62 communicates with and extends into a hollow, spherical center chamber 76. Thus, desiccant bed adsorption media 60 has a spherical configuration and is housed within container 90. The container top surface 92 and the container bottom surface 94 are spaced from the spherical desiccant bed media 60, and the continuous side 96 of the container 90 is likewise spaced from the spherical desiccant bed media 60. The solid segment divider 100 extends from the container 90 to the inner screen 78 adjacent the center chamber 76, thereby forming the first zone 102 and the second zone 104 of the divided spherical desiccant bed adsorption unit 70. A sealable air inlet port 66 is provided in each zone. The first zone 102 and the second zone 104 are preferably equally sized, but may be sized in any proportion to alleviate channeling in the unit 70.

As stated above, the radial and spherical desiccant bed adsorption units 40 and 70, respectively, each have at least one sealable air inlet port 66 per zone with means for opening and closing the port. Inlet ports 66 may be opened and closed pneumatically or hydraulically, but are preferably opened and closed by receipt of an electrical signal from an optional central processor. The signal from the central processor to open and close the inlet port 66 is activated by a sensing device which monitors the air required at the compressor inlet, or by a sensing device which monitors the differential pressure between the intake and exhaust of the desiccant adsorber unit. Opening and closing the inlet ports 66 promotes a balanced air flow to maintain the desired pressure drop across the length of the divided desiccant bed.

In the normal operation of the multiple zone desiccant bed adsorption unit 40, the preferred method of controlling the pressure drop across the length of the divided desiccant bed comprises the first step of allowing air to flow through all of the zones 102, 104 of the desiccant bed when the demand from the compressor 39 reaches a predetermined level, and the second step of preventing the flow of air through at least one of the zones 102, 104 when the demand from the compressor falls below a predetermined level. To continually run the compressor 39 using the unit 40, at least two multiple zone desiccant beds are required, as illustrated in FIG. 1.

The method of drying atmospheric air prior to processing and regenerating saturated desiccant media requires the step of providing a first multiple zone desiccant bed 30, and a second multiple zone desiccant bed 36. Atmospheric air is then drawn, for example, through the first multiple zone desiccant bed 30. When the demand from the compressor 39 is less than a predetermined level, at least one opened zone 102, 104 of the first multiple zone desiccant bed 30 is closed. If the demand from the compressor 39 is greater than the predetermined level, then at least one closed zone 102, 104 of the first multiple zone desiccant bed 30 is opened. The dried atmospheric air is then conveyed through conduit 38 for further processing. The second multiple zone desiccant bed 36 is regenerated at the same time by heating atmospheric air and conveying the heated air from heater 18 through conduit 32 to the second multiple zone desiccant bed. Thus, the desiccant media 60 in the second multiple zone desiccant bed 36 is dried by the heated air passing through the desiccant bed.

Figure 14:
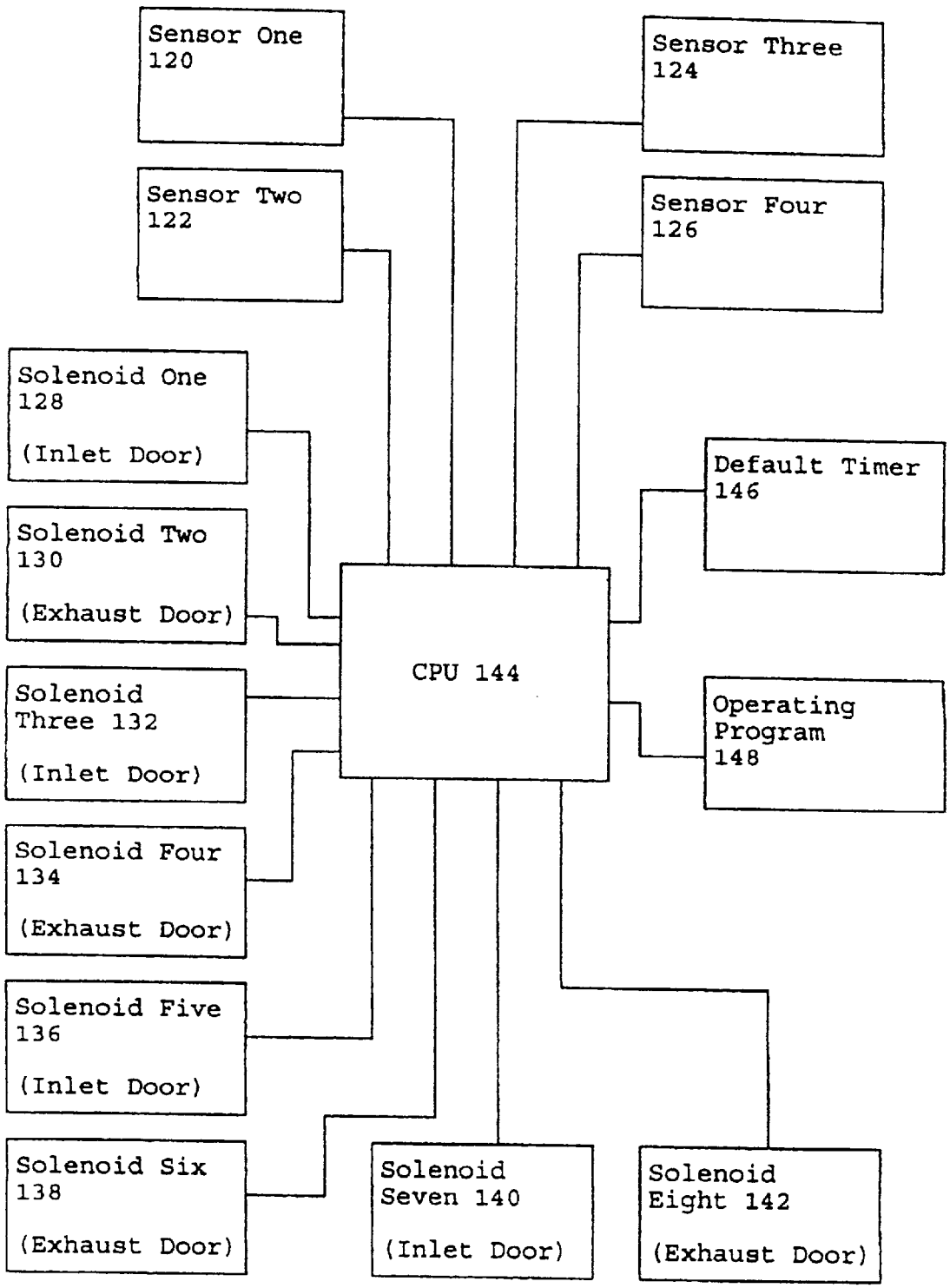
FIG. 14 is a block diagram of an automatic control for the system of FIG. 1.
Figure 15:
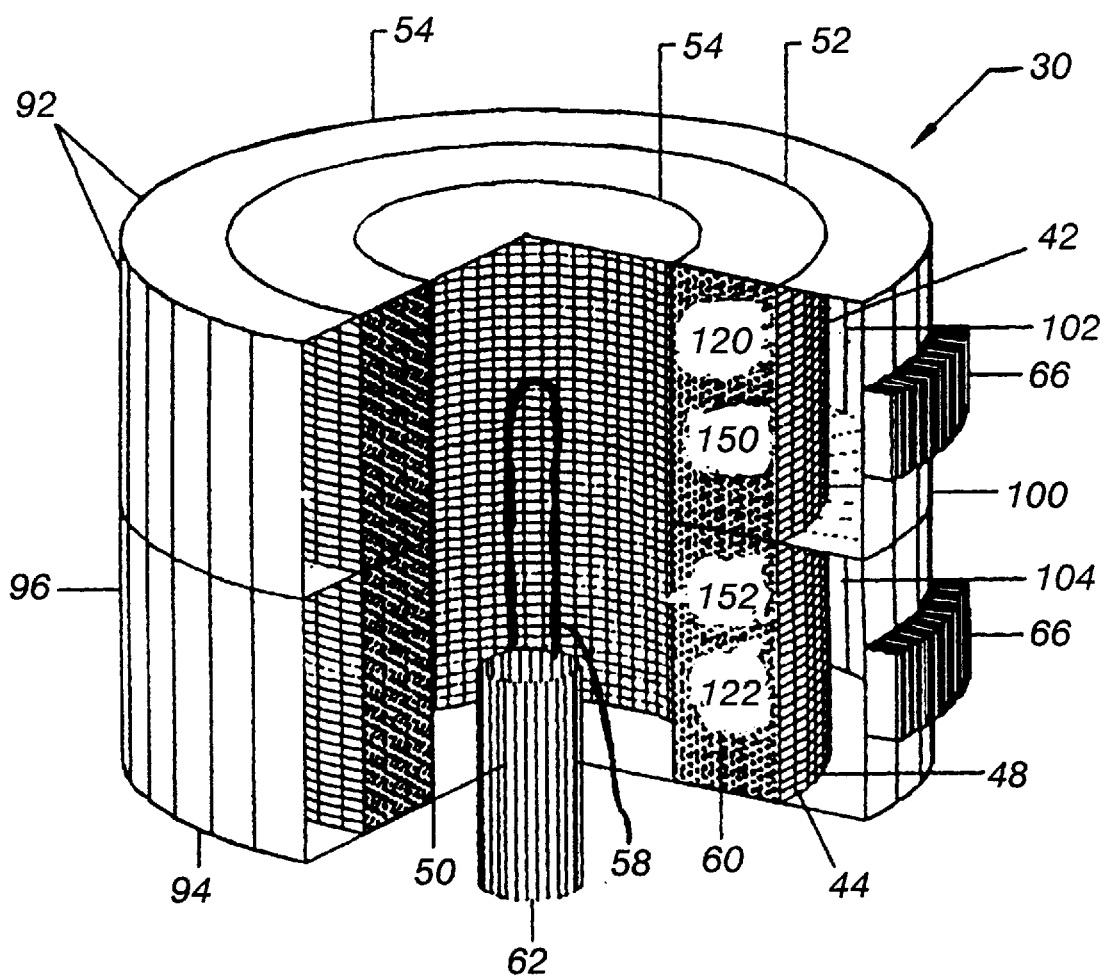
FIG. 15 is a partial cutaway view of a radial adsorber desiccant bed including a dedicated heater and sensors.

The preferred method of drying atmospheric air prior to compression and regenerating saturated desiccant media can be automated by providing automatic sensor means 120, 122 in each zone of the first multiple zone desiccant bed 30 illustrated in FIG. 15, and automatic sensor means 124, 126 in the second multiple zone desiccant bed 36 (not shown). Electronic control means 144 for controlling the adsorption and regeneration phases of each multiple zone desiccant bed 30, 36 is provided. By monitoring the saturation level of each zone with the sensors 120, 122, 124 and 126 (FIG. 14), the control means 144 determines if a predetermined saturation level is reached for the desiccant bed 30, 36 that is in the adsorption phase. When the predetermined saturation level is reached, the control means 144 automatically converts the saturated desiccant bed to the regeneration phase.

One method of regulating the flow of air through the multiple zones of the desiccant bed is to provide separate exhaust doors 130, 134, 138 and 142 (FIG. 14), and separate inlet doors 128, 132, 136 and 140 (FIG. 14) for each zone 102, 104 of the multiple zone desiccant beds 30, 36. Preferably each door is operably connected to a solenoid which permits electronic operation of the door. Control means 144 regulates the air flow through the inlet and exhaust doors by controlling the operation of the doors. While this may be done with a timer 146, it is preferable to use an operating program 148. In the adsorption phase, the inlet door of a zone of the desiccant bed is opened and the exhaust door of the same zone of the same desiccant bed is closed. In the regeneration phase, the exhaust door of the zone of the desiccant bed is opened and the inlet door of the same zone of the same desiccant bed is closed. Further automation can be achieved by controlling the operation of the exhaust and inlet doors for each zone of the multiple zone desiccant bed when the demand from the compressor is less than or greater than a predetermined level. The level of the demand can be measured by additional sensors 150 and 152 (FIG. 15) located in each zone of the multiple zone desiccant bed 30. For this purpose, sensors 150 and 152 are preferably electrically coupled to the moisture sensors 120, 122, respectively.

The pre-compression dehydration system 10 may also include an air conditioner, or precooler 56 (FIG. 1) for cooling the ambient air prior to adsorption. Preferably, the precooler 56 is thermostatically controlled by control means 144 to cool the ambient air to maintain an inlet drybulb and wetbulb temperature not to exceed 55° F. (12.7° C.) to the adsorbing desiccant bed 30. The precooler 56 insures that the temperature of the effluent air will not exceed 100° F. (37.8° C.) as a result of the heat energy produced during the adsorption process. The precooler 56 operates only when the ambient drybulb temperature exceeds 55° F. (12.7° C.). In addition, a dedicated heater 58 (FIG. 15) may be located within the center chamber of each multiple zone desiccant bed 30, 36 to improve the rate of heat transfer to the desiccant media 60 during the regeneration phase.

Alternative Embodiments

Alternatively, the divided radial and spherical desiccant beds may have three or more zones, each differing in desiccant surface area to meet a variety of air flow requirements for a gas compressor 39. Specifically, two or more solid dividers are used to divide the desiccant tube or sphere into three or more zones, each having a sealable air inlet port. Such a unit enables a large compressor to draw air through only a small portion of the entire desiccant bed when demand from the compressor is low, and to draw air through a larger portion, or all, of the desiccant bed when demand from the compressor is high.

Figure 5:
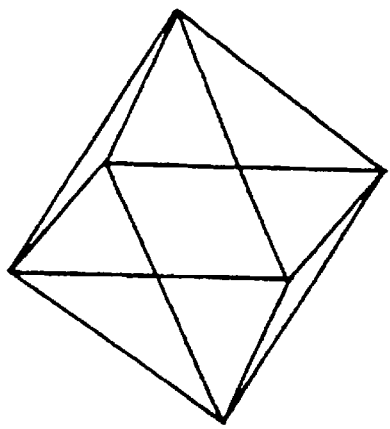
FIGS. 5–8 illustrate polyhedrons which may be utilized in alternative embodiments of the invention, the illustrated polyhedrons being an octahedron, dodecahedron, icosahedron, and hexaoctahedron, respectively.
Figure 6:
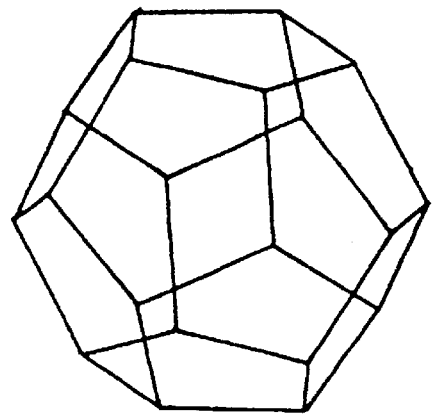
Figure 7:
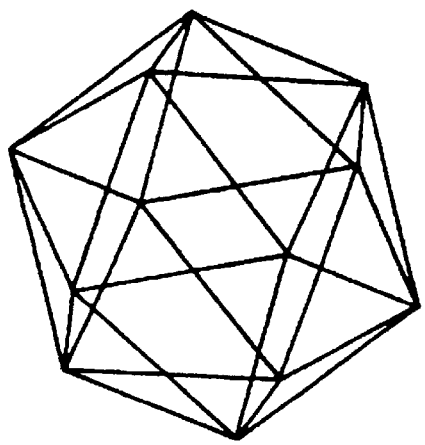
Figure 8:
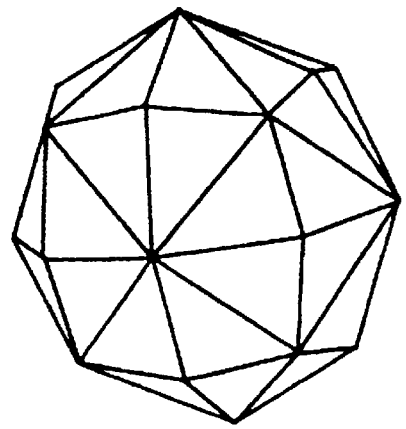

In determining the optimal geometrical configuration of the desiccant bed, it is necessary to consider that air will take the path of least resistance when flowing through the desiccant bed. Thus, although a cubic desiccant bed may be desirable for ease of manufacture, the corners of the cube where the sides meet will have excess desiccant media 60 which will hinder air flow through the desiccant bed. As additional sides are used to construct a three dimensional geometric shape, the amount of the desiccant media 60 subjected to the air flow increases. Desiccant beds configured as polyhedrons, such as an octahedron (FIG. 5), a dodecahedron (FIG. 6), an icosahedron (FIG. 7), or a hexaoctahedron (FIG. 8), increase the overall effectiveness of a given amount of desiccant media 60 as the multi-sided geometric configuration approximates a sphere.

EXAMPLES

The present invention, which is most accurately referred to as a Presorber, dries air at atmospheric pressure to an extremely low dewpoint prior to the air being compressed by a compressor 39, such as a rotary screw air compressor. The Presorber overcomes all of the difficulties encountered when using desiccant adsorption to dry air at atmospheric pressure, while meeting or exceeding the dewpoint reduction that can be obtained using a compressed air dryer. As the atmospheric air is compressed, its relative dewpoint increases. The Presorber must be able to suppress the dewpoint of the compressed air to at least −20° F. (−29° C.), and preferably to at least −70° F. (−94° C.), so as to maintain an effluent compressed dewpoint that is equal to, or superior to, the effluent dewpoint produced by existing compressed air dryers. Such a level of efficiency in dehydration of compressed air has not previously been achieved by any type of dryer or dehumidifier.

The geometry of the desiccant beds in the Presorber allows the air to flow radially from the outer diameter 48 of the radial desiccant bed 40 through the desiccant media 60 towards the innermost diameter 50 to an internal plenum 46 sized for even flow diffusion (FIG. 3). The concept of radial flow adsorption optimizes all of the engineering parameters previously described herein. First, because of the cylindrical (i.e., radial) geometry, the surface area opposing the gas flow is increased dramatically as compared to a circular geometry in an axially configured unit. The inherent advantage of a radially configured unit is that the flow is spread out over a larger area, thus the equivalent velocity of the radial bed is substantially reduced. This accomplishes the goal of increasing the residual contact time while at the same time slowing the gas flow to increase the dynamic capacity to a level closer to the static capacity of the desiccant.

The second advantage of the radially configured unit is the volumetric capacity afforded by this geometry. The mass of desiccant media 60 required to create an adequate contact time and pressure drop to prevent channeling is minimized. Reducing the bed depth, coupled with increasing the surface area of the desiccant, effectively widens the mass transfer zone and minimizes the concentration of mass transfer. Accordingly, the heat energy created by adsorption is dramatically lowered.

When the bed geometry is optimized, the performance characteristics of the Presorber show significant improvement compared with existing configurations, especially the axial flow configurations. For purposes of example, four radial bed configurations which are sized for precompression adsorption of a 100 horsepower rotary screw air compressor are tabulated below. It is evident that the flow characteristics are quite different for each configuration, even though all of the beds are radial. The configurations are labeled "Radial 1" through "Radial 4" for identification. The intake capacity of a 100 horsepower rotary screw air compressor is about 500 cubic ft/min. (152.4 cubic M/min.). Since the regeneration unit requires 100 cubic ft/min (30.5 cubic M/min.) of the dried effluent gas, the Presorber is configured to dry at least 600 cubic ft/min. (182.9 cubic M/min.). Because the gas flow dynamics change as the gas progresses through a radial bed, the bed must be analyzed incrementally. The analysis evaluates the progress of the gas in increments of ¼" (0.6 cm) of radial bed depth.

TABLE 3

|  | Radial 1 | Radial 2 | Radial 3 | Radial 4 |
| --- | --- | --- | --- | --- |
| Cylinder O.D. (in): | 36 | 48 | 48 | 32 |
| Cylinder O.D. (cm): | 91 | 122 | 122 | 81 |
| Cylinder I.D. (in): | 6 | 18 | 28 | 7.5 |
| Cylinder I.D. (cm): | 15 | 46 | 71 | 19 |
| Cylinder height (in): | 36 | 34 | 48 | 72 |
| Cylinder height (cm): | 91 | 86 | 122 | 183 |
| Mass desiccant req'd.: | 664 | 664 | 664 | 664 |
| Actual mass by volume: | 990 | 1469 | 1592 | 1520 |
| Req'd regen. flow: | 109 | 123 | 126 | 125 |
| Heater size (KW): | 11 | 12.3 | 12.65 | 12.5 |
| Total ΔP (psi): | .153 | .068 | .024 | .047 |
| Min. ΔP (psi): | .00086 | .00066 | .00045 | .00045 |
| Contact time (sec): | 2.062 | 3.06 | 3.316 | 3.167 |
| Min. velocity (ft/min): | 21.34 | 16.94 | 12 | 12 |
| Min. velocity (M/min): | 6.50 | 5.16 | 3.66 | 3.66 |
| Max. velocity (ft/min): | 122.23 | 44.32 | 20.28 | 49.287 |
| Max. velocity (M/min): | 37.26 | 13.51 | 6.18 | 15.02 |

Figure 9:
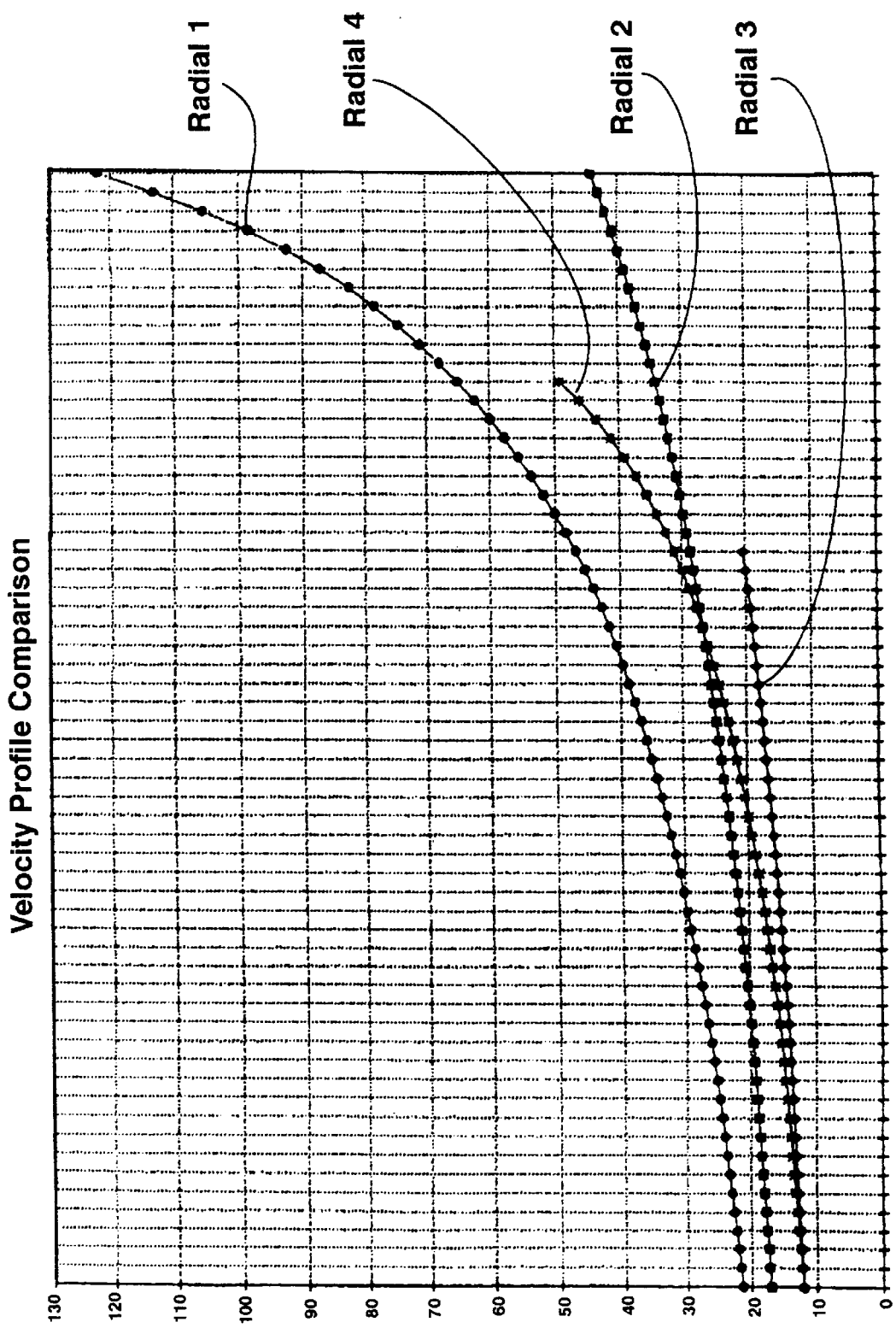
FIG. 9 is a plot of velocity profile comparison for four radial Presorbers.
Figure 10:
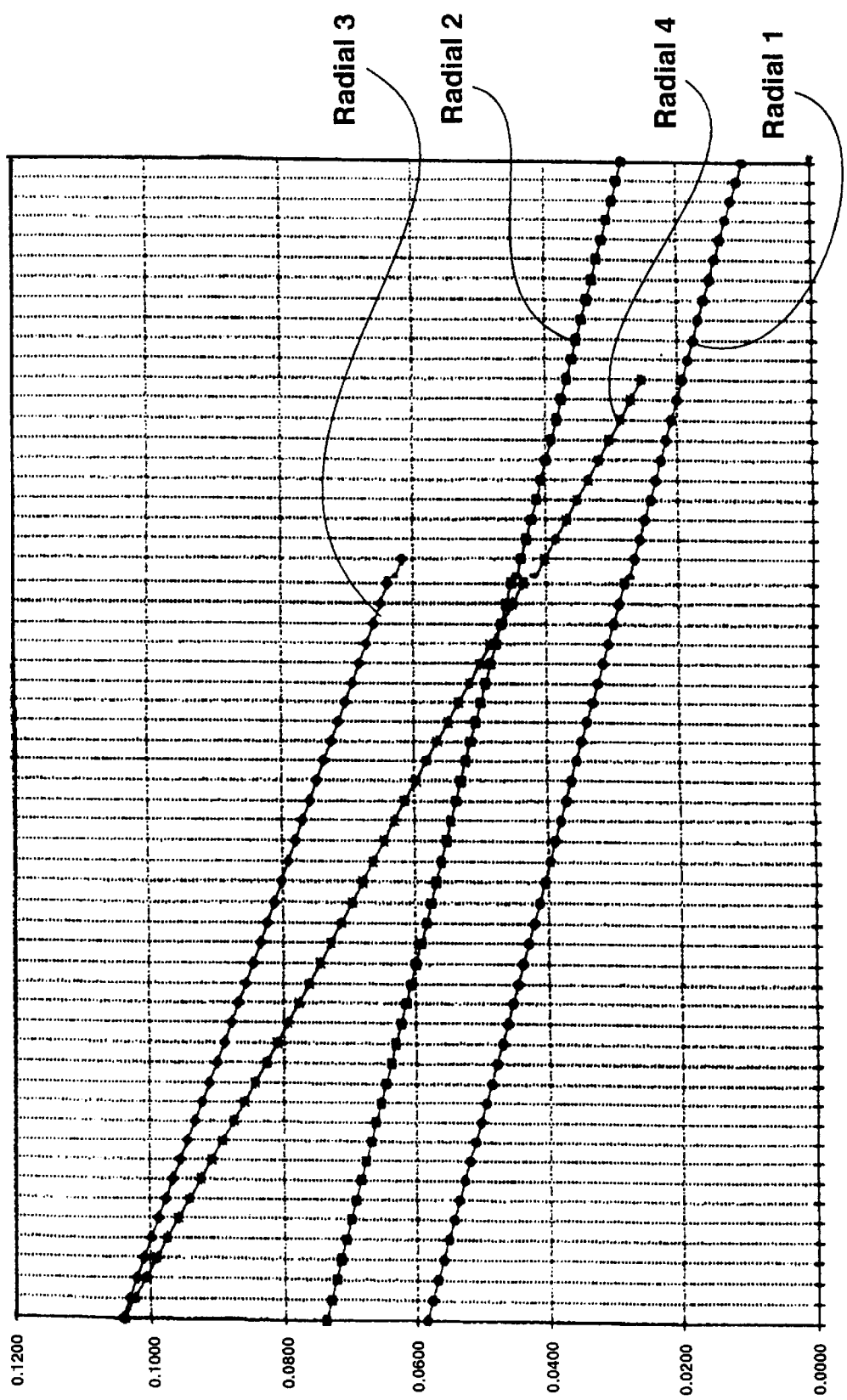
FIG. 10 is a plot of contact time profile comparison for four radial Presorbers.
Figure 11:
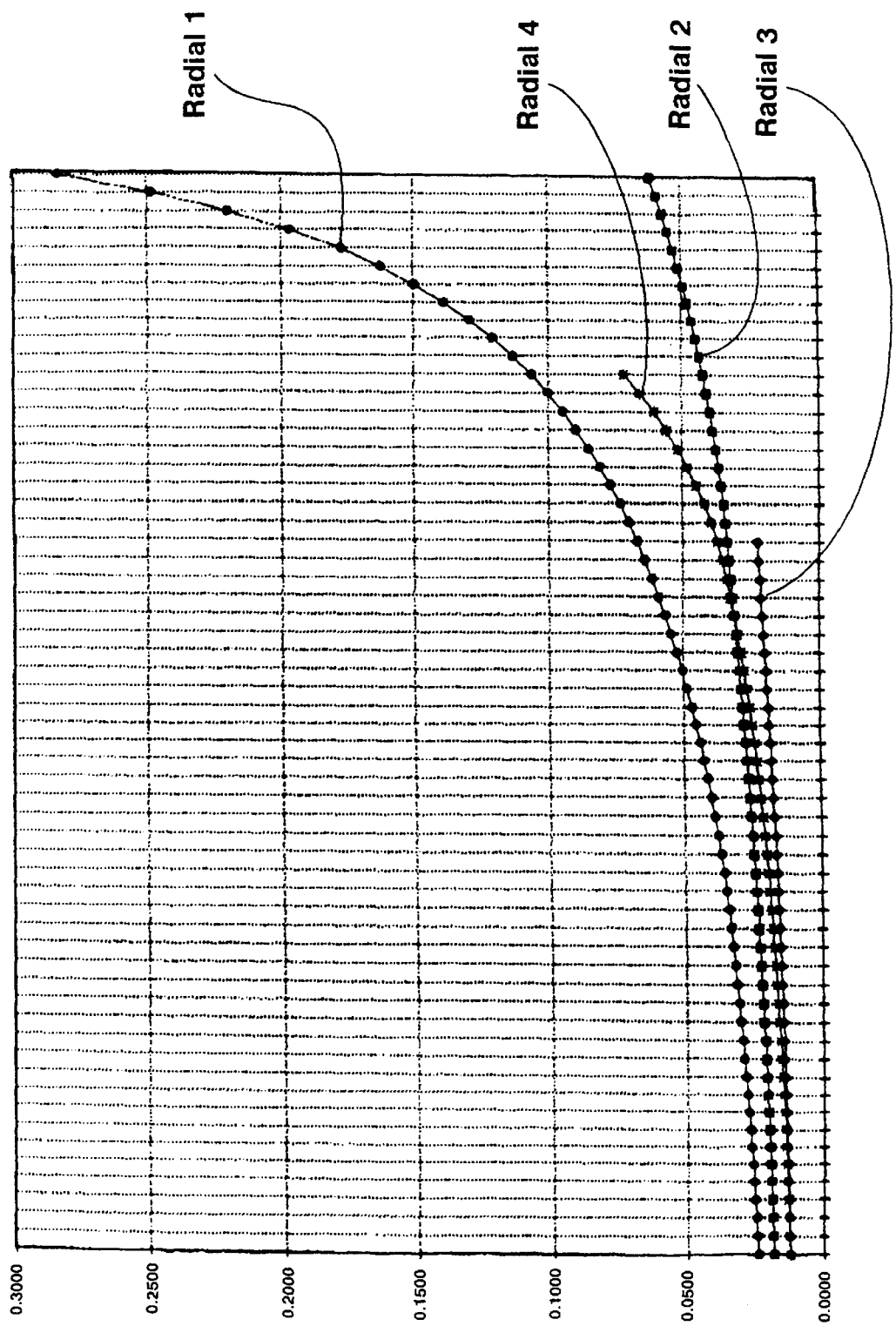
FIG. 11 is a plot of pressure drop profile comparison for four radial Presorbers.
Figure 12:
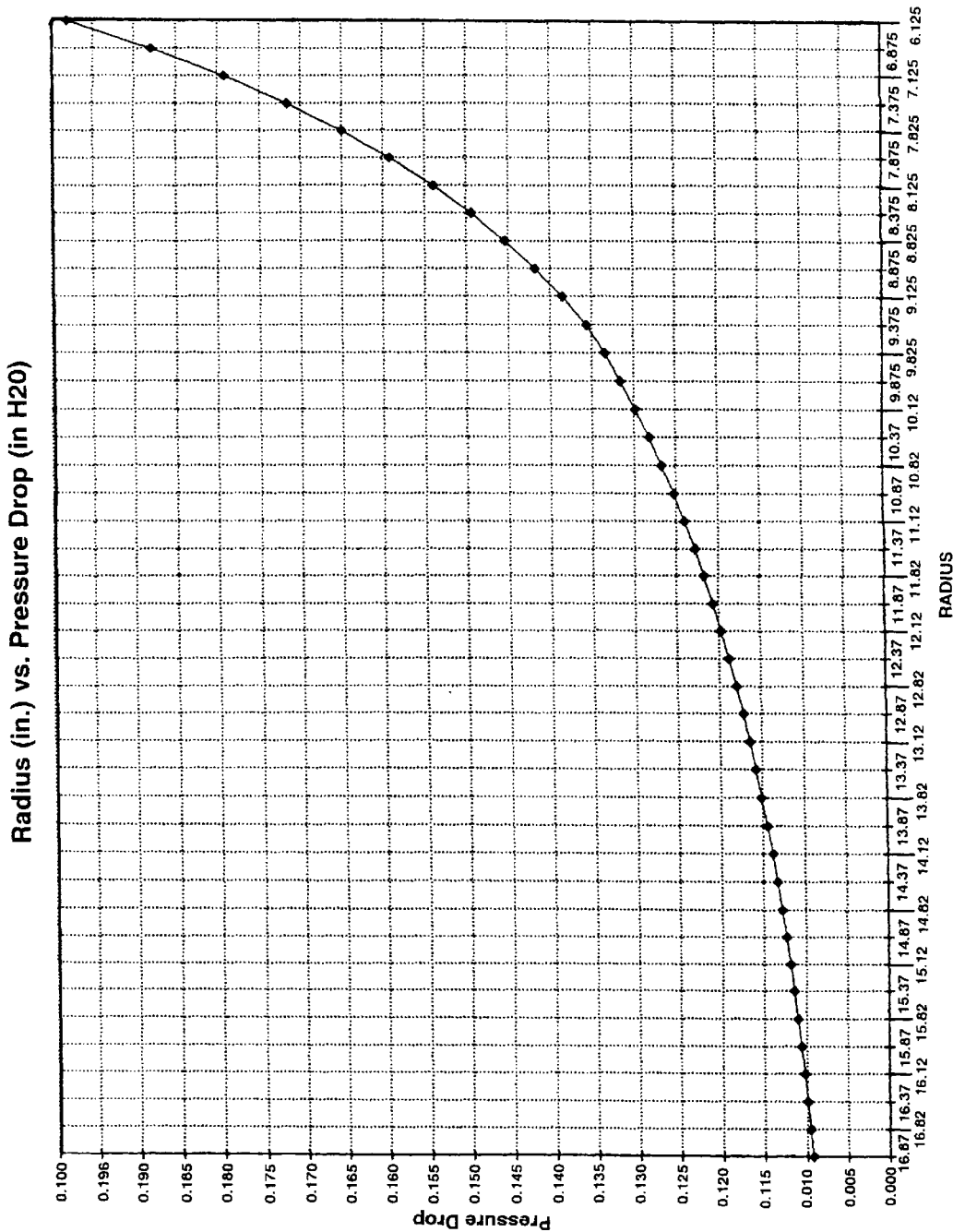
FIG. 12 is a plot of pressure drop profile comparison for four spherical Presorbers.

The profile curves shown in FIGS. 9–11 plot the flow characteristics for each configuration against the others. The results of this comparison graphically illustrate the unique characteristics of the Presorber as an effective precompression dryer. All four configurations contain more than enough desiccant to adsorb the required water loading, which is based on 4 hours of adsorption and 4 hours of regeneration. The regeneration flows required are similar for all 4 radial configurations, but since radial configurations 2, 3 and 4 hold twice the desiccant than is actually necessary, their cycles may be extended, reducing both volumetric flow and heat energy. Desiccant volume is a parameter which could be optimized to reduce both desiccant cost and operational energy costs. The comparison shows that the calculated heater sizes are also similar.

All four configurations maintain a total pressure drop greater than 0.01 psi per foot (21.4 g/cm$^2$ per cm) of bed depth. As previously discussed, this requirement is important to eliminate gas channeling. Each configuration maintains the minimum incremental pressure drop at the outermost diameters where flow velocities are lowest and the opportunity for channeling is greatest. Another parameter of comparison is contact time. Only Radial 2, 3 and 4 configurations significantly exceed the minimum desired contact time of 2 seconds. Thus, Radial 1 is eliminated from consideration. A further parameter of comparison is velocity. Although all three configurations maintain a maximum velocity less than 50 ft/min (15.2 M/min), Radial 3 has a very low and narrow band of velocity variation, making it highly desirable. Examination and comparison of this information as plotted on the profile curves in FIGS. 9–11 clarifies that the configuration with the most potential for excellent performance and optimization is the Radial 3 configuration.

The main objective of this example is to illustrate the complex nature of the Presorber configuration. The divided desiccant bed adsorption unit is truly unique and cannot be compared to, or considered an improvement on, any existing art. The Presorber configuration disclosed herein, is not merely a combination of existing configurations, but is a desiccant bed configuration which has the potential for unlimited performance and optimization. Because the divided desiccant bed is intended to be used in conjunction with a rotary screw air compressor, it is important to understand the workings of such a compressor and the benefit that the Presorber provides to this application.

Figure 13:
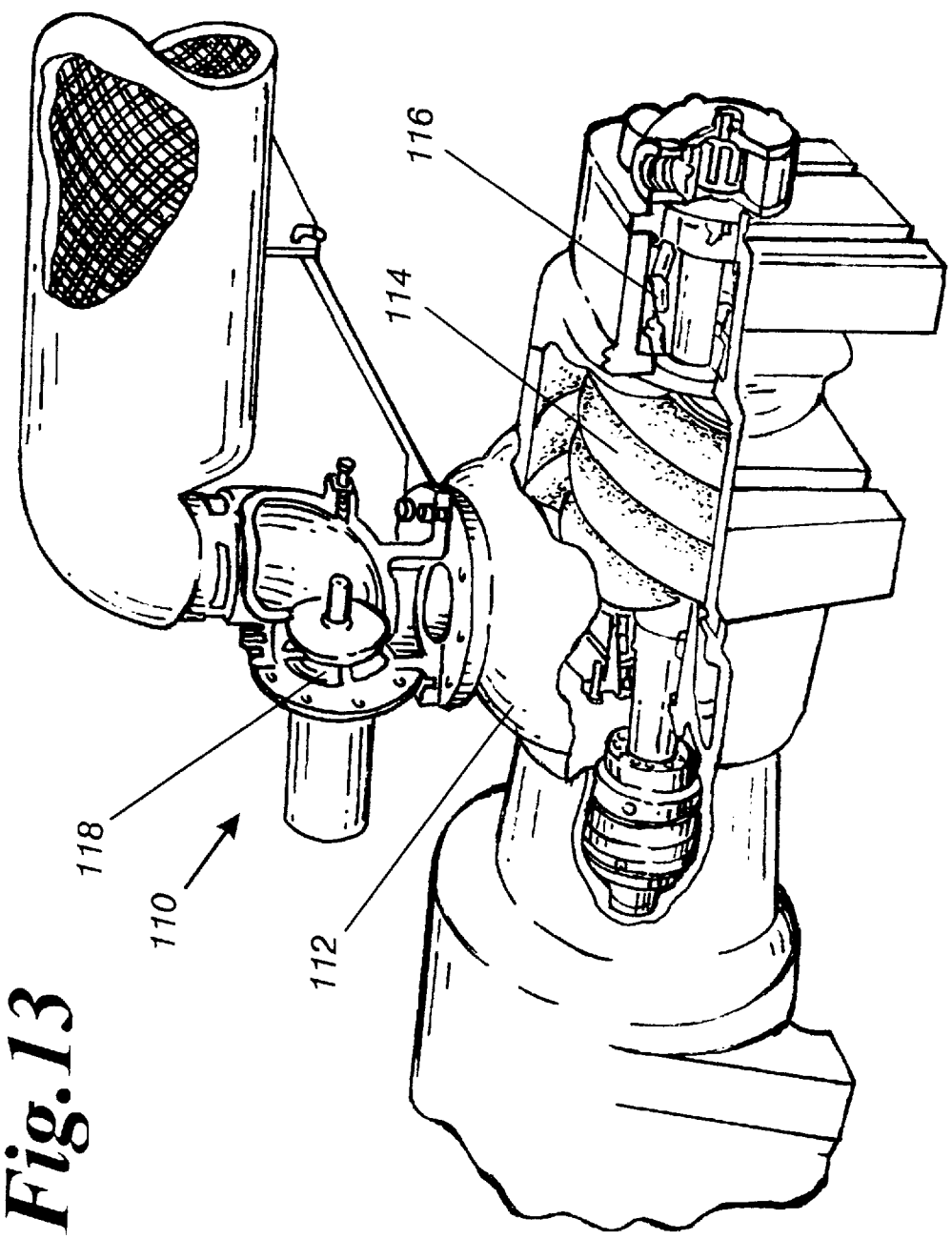
FIG. 13 is a partial cutaway view of a rotary screw air compressor airend.

The compression component of this type of compressor is referred to as an airend. FIG. 13 is a partial cutaway view of the airend 110 of a rotary screw air compressor available from Coltec Industries, Quincy Compressor Division. The airend 110 comprises a housing 112, at least one, and preferably two, helical rotors 114 positioned on a shaft, ball or roller bearings 116, and on some configurations, a mechanical oil pump. The helical rotors 114 are driven at a constant speed regardless of the demand to produce compressed air. The actual air demand is addressed by throttling the incoming air with a modulating inlet valve 118, or by operating the machine with the inlet valve fully open or fully closed depending on exiting air pressure. Although the shaft speed remains constant for either means of addressing the variable air demand, the thrust impact on the bearings is more subtle for the modulating method.

Most manufacturers engineer the airend with tapered roller bearings to more effectively absorb the axial and radial thrust loads that the rotors experience during compression. Because the rotors are machined to very close tolerances and are not intended to touch one another, bearing performance is important to the life of the airend. A failed bearing will cause the rotors to come into contact with each other, which may result in damage requiring either extensive repair or complete replacement of the airend. The cost of an airend is typically at least 50% of the cost of the entire compressor package. For example, a new 100 horsepower Quincy QSI rotary screw air compressor sells for approximately US $25,000, while a new airend for this machine costs approximately US $13,000.

The type of air compressor discussed above uses a closed loop, recirculating oil system to provide lubrication and cooling to the airend. The oil floods the airend to provide cooling and bearing lubrication, and is carried out of the airend with the compressed air. The air/oil mixture enters an air/oil separator in which the oil is separated from the air and then directed to an oil cooler to reduce its temperature to approximately 140° F. (60° C.). From the oil cooler, the oil is filtered and returned to the airend for recirculation by either a mechanical oil pump or by pressure differential in the airend.

Tapered roller bearings used in rotary screw air compressors 20 require a certain quality of lubrication. The effects of dissolved water, particulate contamination and high operating temperatures can significantly reduce the fatigue life of a tapered roller bearing. Manufacturers utilizing rotary screw air compressors typically operate their compressors "hot" or hotter than necessary. This is done intentionally so that the thermal environment inside the compressor is less conducive to moisture condensation. Assuming the compressor operates continuously in a loaded condition, this is an acceptable means of controlling condensation. However, if the compressor is unloaded, very little heat is produced in the airend and the oil temperature drops. If the compressor remains unloaded for an extended period, the timer is automatically shut off. Obviously, in this state no heat is produced and the temperature tends to approach ambient temperature.

Manufacturers will typically purchase air compressors in quantities suitable to satisfy the current air demands of a manufacturing facility and with enough additional capacity for anticipated future growth. Thus, the compressors are not operating fully loaded, and the heat loads change on a regular basis. Accordingly, the oil temperature is repeatedly varied. Since most manufacturing operations that require compressed air come to a grinding halt without compressed air, backup compressors are purchased to maintain plant air in the event of a main system failure. To balance the wear of these machines, the compressors are rotated manually or automatically on a continual basis. Further, not all manufacturing processes operate 24 hours per day, and when there is little or no demand for air the compressor is generally turned off. When "off line," the "backup" compressor is at ambient temperature. It is during these low load or no load situations when the compressor is turned off that moisture can condense inside the airend.

When engineers design or select air compressors, they typically specify a bearing load, a required life and an expected water content that the bearing will experience. For Example, Coltec Industries, Quincy Compressor Division, uses a specification of 100 ppm of dissolved water as the maximum content that the bearing manufacturer recommends for exposure to the bearings. In practice, compressors often condense water to levels well above the specification limit of 100 ppm. This water condensation can reduce the life of the compressor bearings significantly. Two publications which address the effects of water in oil on bearing fatigue life are "The Effect of Water in Lubricating Oil on Bearing Fatigue Life" by Richard E. Cantley of the Timken Bearing Company, and "Lubrication" a technical publication by Timken Bearing, the disclosures of which are expressly incorporated herein by reference.

The results of Cantley's study confirm that water concentrations greater than 100 ppm in lubricating oil result in a dramatic reduction in bearing fatigue life. The tests performed show that water concentrations of 400 ppm in lubricating oil reduce the bearing life by up to 48%. The same study shows that reduction of water concentrations to 25 ppm increased bearing life by up to 259%. The curve entitled "Lube Life" in Cantley's publication illustrates that at water concentrations of only 5 ppm, bearing life can be increased by up to 600%. The potential for water condensation is eliminated with the use of the Presorber disclosed herein as the air is dried to dewpoint levels well below the cool ambient temperatures that the compressor experiences during low load or no load situations.

In addition, the Presorber eliminates downstream component pressure losses, thus reducing the brake horsepower (BHP) required to overcome these losses. The Presorber also eliminates the need for a downstream aftercooler, a moisture separator and drain trap, a prefilter, and an afterfilter for the compressed air dryer. In current compressor configurations, sump pressures generally run 5 to 7 psig (351.5 to 492.1 gm/cm$^2$g) higher than the package discharge pressure downstream of the aftercooler. Another 0.5 to 0.75 psig (35.2 to 52.7 gm/cm$^2$g) is lost in the moisture separator and drain trap. Pressure through a typical refrigerated dryer is about 4 to 5 psig (281.2 to 351.5 gm/cm$^2$g). Filters usually have about 1 psig (70 gm/cm$^2$g) pressure drop. In a typical system, a 13 to 14 psig (914.0 to 984.3 gm/cm$^2$g) pressure difference can be expected between the dry-side sump pressure and the system header. Since one pound of pressure equals 0.5% of the BHP required, eliminating these pressure drops will result in a BHP reduction of 6.5% to 7%. This BHP reduction is a directly measurable savings in energy use.

Another benefit of the Presorber is evident in its increased capacity in high humidity conditions. When ambient temperatures are in the 90's and humidities are near 80%, about 4% of the ambient air is water vapor. Most users of compressed air report that it is more difficult to maintain system pressure during summer months than during winter months. This can be attributed to the effect of temperature on air density. Temperature, however, is not the only direct cause of this reduction in mass flow. Higher ambient temperatures allow air to hold more water vapor before reaching saturation. This water vapor displaces dry air as it enters the compressor. Aftercoolers and dryers remove the water vapor by condensing it to liquid, leaving the dry air to satisfy the system requirements. By removing the water vapor downstream of the compressor, the user reduces the amount of available compressed air by as much as 4%. With the Presorber, the compressor is compressing only dry air. The air flow into the Presorber may be as much as 4% higher than the rated capacity of the compressor because both air and water vapor are flowing into the Presorber, but only air is flowing from the Presorber to the compressor.

Another benefit of the Presorber is that the compressor can discharge the compressed air at a higher temperature. Gas laws state that volume and pressure increase and decrease in direct proportion to absolute temperature. In typical rotary screw air compressors, almost all of the input energy is converted to heat energy. About 12% to 15% of this heat energy is retained by the compressed air as it leaves the airend. Traditional drying methods require the compressed air to be cooled to condense and remove the water vapor. This usually results in a compressed air temperature leaving the dryer that is at or below the ambient air temperature. Thus, the cooling process removes 12% to 15% of the energy available in the compressed air system.

Since the compressed air in a system with a Presorber does not need aftercooling or drying after compression, the compressed air enters the compressed air system at a temperature which is close to the airend discharge temperature. The discharge temperature on a Presorber equipped compressor is only about 140° F. (60° C.). This temperature allows for the retention of an additional 5% to 6% of in the total input energy. Experience with compressed air reheaters suggests that some of the energy is lost as the temperature of the air cools in the pipe distribution system, but that most of the heat energy is retained and the savings can be calculated for a particular application. Since the compressor can be operated at lower temperatures, the life of the lubricant is increased. In addition, because the viscosity of the oil remains high, the volumetric efficiency of the airend is increased. Further, lubricant temperatures can be optimized for film strength, additive life and volumetric efficiency. It is also possible that a less costly lubricant could be used without sacrificing airend reliability or lubricant service life due to the lower operating temperature of the compressor.

Another advantage of a compressor equipped with a Presorber is that any possible concern about contaminated water disposal is eliminated. A Presorber removes water vapor without first condensing it to a liquid. The collected water vapor is returned to the atmosphere without ever entering a liquid state. Therefore, the Presorber eliminates aftercooler and dryer condensate which may be contaminated with compressor oil.

The Presorber may also be utilized advantageously in the oil-free compressor market. The condensate trapped downstream of the separator on currently available rotary screw air compressors contains a mixture of lubricant and water. Thus, the condensate must be treated as waste and lubricant must be separated from the water before disposal. In a Presorber/compressor combination, there is no condensate in the discharge air stream. Further, a coalescing filter may be included in the discharge air piping. A properly sized coalescing filter can remove 99.9999+% of the oil carryover. Conventional filters must treat the extracted lubricant as a waste product because it is considered to be contaminated with water. Without water contamination, a scavenge line can return the extracted lubricant to the compressor. This gives the oil-free compressor industry a significant cost advantage over available oil-flooded compressors.

Another advantage is that a Presorber/compressor combination provides two-stage compressor efficiencies from a single-stage compressor without the additional cost of a two-stage compressor. Compressors can be optimized for maximum flow rates at lower pressures because downstream pressure losses have been eliminated. For example, a Quincy Model QSI-500 can be optimized to around 545 cubic feet per minute at a 95 psig (6679 gm/cm$^2$g) discharge pressure instead of the 500 cubic feet per minute at 110 psig (7733 gm/cm$^2$g) that is currently available. This results in a yield of 20.18 BHP/100 cubic feet per minute. Lubricant-flooded, two-stage compressors have efficiencies that typically range from about 19.7 BHP/100 cubic feet per minute to about 20.8 BHP/100 cubic feet per minute. However, flooded two-stage compressors do not have energy efficient part load controls. Thus, a Presorber/compressor coupled with a lift valve airend has a definite, measurable advantage over two-stage compressors when running at part load.

Summary of the Achievement of the Objects of the Invention

From the foregoing, it is readily apparent that the invention is an improved method and apparatus for pre-compression drying of atmospheric air that produces an even flow of air through adsorber beds and eliminates the potential for air channeling in the desiccant bed when the demand for air by a compressor is less than 100%. Improved air flow distribution at low demand levels are maintained, thus allowing the Presorber to achieve a level of performance heretofore unattainable.

It is to be understood that the foregoing description and specific embodiments are merely illustrative of the best mode of the invention and the principles thereof, and that various modifications and additions may be made to the apparatus by these skilled in the art, without departing from the spirit and scope of the invention, which is therefore understood to be limited only by the scope of the appended claims.

That which is claimed is:

1. A method of drying atmospheric gas passing through a desiccant media of a first divided desiccant bed adsorption unit prior to providing the gas having a lowered dewpoint to an inlet valve of a gas compressor while regenerating a spent desiccant media in a second divided desiccant bed adsorption unit, the method comprising the steps of providing a first pre-compression divided desiccant bed adsorption unit and a second pre-compression divided desiccant bed adsorption unit;

drawing substantially atmospheric gas through the desiccant media of the first pre-compression divided desiccant bed absorption unit;

conveying the dried substantially atmospheric gas from the first pre-compression divided desiccant bed adsorption unit through a gas discharge conduit to the inlet valve of the gas compressor; and drawing heated substantially atmospheric gas through the desiccant media of the second pre-compression divided desiccant bed adsorption unit.

2. A method of drying atmospheric gas passing through a desiccant media of a divided desiccant bed adsorption unit prior to providing the gas having a lowered dewpoint to an inlet valve of a gas compressor, the method comprising the steps of providing a first pre-compression divided desiccant bed adsorption unit having a first zone of the desiccant media and a second zone of the desiccant media;

drawing substantially atmospheric gas through the desiccant media of at least one of the first zone and the second zone of the first pre-compression divided desiccant bed adsorption unit; and conveying the dried substantially atmospheric gas from the first pre-compression divided desiccant bed adsorption unit through a gas discharge conduit to the inlet valve of the gas compressor.

3. A method of drying atmospheric gas according to claim 2 further comprising the steps of providing an inlet door and an exhaust door communicating with each of the first zone and the second zone of the first precompression divided desiccant bed adsorption unit;

closing the inlet door of one of the first zone and the second zone of the first pre-compression divided desiccant bed adsorption unit when the demand from the gas compressor falls below a predetermined value.

4. A method of drying atmospheric gas according to claim 3 further comprising the step of opening the closed inlet door of the one of the first zone and the second zone of the first pre-compression divided desiccant bed adsorption unit when the demand from the gas compressor exceeds the predetermined value.

5. A method of drying atmospheric gas according to claim 3 further comprising the steps of
providing a second pre-compression divided desiccant bed adsorption unit having a first zone of the desiccant media and a second zone of the desiccant media; and
drawing heated substantially atmospheric gas through the desiccant media of at least one of the first zone and the second zone of the second pre-compression divided desiccant bed adsorption unit.

6. A method of drying atmospheric gas according to claim 5 further comprising the steps of
providing an inlet door and an exhaust door communicating with each of the first zone and the second zone of the second pre-compression divided desiccant bed adsorption unit;
closing the inlet door of one of the first zone and the second zone of the second pre-compression divided desiccant bed adsorption unit when the demand from the gas compressor falls below a predetermined value.

7. A method of drying atmospheric gas according to claim 6 further comprising the step of
opening the closed inlet door of the one of the first zone and the second zone of the second pre-compression divided desiccant bed adsorption unit when the demand from the gas compressor exceeds the predetermined value.

8. A pre-compression gas-dehydration system comprising
a blower;
a heater in fluid communication with said blower;
a first valve and a second valve each in fluid communication with said heater;
a first divided desiccant bed adsorption unit in fluid communication with said first valve;
a second divided desiccant bed adsorption unit in fluid communication with said second valve;
a dried gas discharge conduit in fluid communication with said first desiccant bed adsorption unit and said second desiccant bed adsorption unit for providing dried substantially atmospheric gas having a lowered dewpoint to an inlet valve of a gas compressor.

9. A pre-compression gas-dehydration system according to claim 8 further comprising a filter in fluid communication with said blower.

10. A pre-compression gas-dehydration system according to claim 8 further comprising a precooler in fluid communication with said first desiccant bed adsorption unit and said second desiccant bed adsorption unit for providing gas having an inlet temperature that does not exceed a predetermined inlet drybulb and wetbulb temperature to said first desiccant bed adsorption unit and said second desiccant bed adsorption unit.

11. A pre-compression gas-dehydration system according to claim 10 wherein the predetermined inlet drybulb and wetbulb temperature does not exceed 55° F. (12.7° C.).

12. A pre-compression gas-dehydration system according to claim 10 wherein each of said first desiccant bed adsorption unit and said second desiccant bed adsorption unit is provided with an inlet door and an exhaust door so that one of said first and said second desiccant bed adsorption units is adsorbing moisture while the other of said first and said second desiccant bed adsorption units is regenerating.

13. A pre-compression gas-dehydration system according to claim 8 wherein each of said first desiccant bed adsorption unit and said second desiccant bed adsorption unit comprises a cylindrical, tubular container having a top, a bottom and a continuous side extending between the top and the bottom;
a desiccant media positioned within said container between an inner screen and an outer screen, said inner screen defining a hollow center chamber within said container; and
a tubular center channel in fluid communication with said center chamber and said dried gas discharge conduit.

14. A pre-compression gas-dehydration system according to claim 13 wherein each of said first desiccant bed adsorption unit and said second desiccant bed adsorption unit is configured for radial flow.

15. A pre-compression gas-dehydration system according to claim 14 wherein
said inner screen and said outer screen are cylindrical so that said desiccant media is annular shaped; and wherein
each of said first desiccant bed adsorption unit and said second desiccant bed adsorption unit further comprises a solid segment divider that extends between the continuous side of said container and said inner screen thereby forming a first zone and a second zone of said desiccant media positioned within said container.

16. A pre-compression gas-dehydration system according flow claim 15 wherein said container is provided with at least one sealable inlet port.

17. A pre-compression gas-dehydration system according to claim 15 wherein the continuous side of said container and said outer screen are spaced apart to form a gap zone between the exterior surface of said annular shaped desiccant media and the continuous side of said container.

18. A pre-compression gas-dehydration system according to claim 15 wherein each of said first zone and said second zone of each of said first desiccant bed adsorption unit and said second desiccant bed adsorption unit is provided with an inlet door and an exhaust door so that said desiccant media of at least one of said first and said second zone of said first and said second desiccant bed adsorption units is adsorbing moisture while said desiccant media of at least one of said first and said second zone of the other of said first and said second desiccant bed adsorption units is regenerating.

19. A pre-compression gas-dehydration system according to claim 18 further comprising means for controlling the operation of each of said inlet door and said exhaust door of each of said first and said second zone of each of said first and said second desiccant bed adsorption unit.

20. A pre-compression gas-dehydration system according to claim 19 wherein said means for controlling the operation of each of said inlet door and said exhaust door comprises
a computer having a central processor which can be programmed to operate the pre-compression gas-dehydration system automatically;
a first solenoid mechanically coupled to said inlet door of said first zone of said first desiccant bed adsorption unit;
a second solenoid mechanically coupled to said exhaust door of said first zone of said first desiccant bed adsorption unit;
a third solenoid mechanically coupled to said inlet door of said second zone of said first desiccant bed adsorption unit;
a fourth solenoid mechanically coupled to said exhaust door of said second zone of said first desiccant bed adsorption unit;

a fifth solenoid mechanically coupled to said inlet door of said first zone of said second desiccant bed adsorption unit;

a sixth solenoid mechanically coupled to said exhaust door of said first zone of said second desiccant bed adsorption unit;

a seventh solenoid mechanically coupled to said inlet door of said second zone of said second desiccant bed adsorption unit;

an eighth solenoid mechanically coupled to said exhaust door of said second zone of said second desiccant bed adsorption unit;

a first sensor communicating with said first zone of said first desiccant bed adsorption unit and electrically connected to said first solenoid and said second solenoid; and a second sensor communicating with said second zone of said first desiccant bed adsorption unit and electrically connected to said third solenoid and said fourth solenoid;

a third sensor communicating with said first zone of said second desiccant bed adsorption unit and electrically connected to said fifth solenoid and said sixth solenoid; and a fourth sensor communicating with said second zone of said second desiccant bed adsorption unit and electrically connected to said seventh solenoid and said eighth solenoid.

21. A pre-compression gas-dehydration system according to claim 20 wherein said means for controlling comprises a first demand sensor communicating with said second zone of said first desiccant bed adsorption unit for sensing when the demand from the compressor is below a predetermined value, said first demand sensor electrically connected to said second sensor; and a second demand sensor communicating with said second zone of said second desiccant bed adsorption unit for sensing when the demand from the compressor is below a predetermined value, said second demand sensor electrically connected to said fourth sensor.

22. A pre-compression gas-dehydration system according to claim 13 wherein each of said first desiccant bed adsorption unit and said second desiccant bed adsorption unit is configured for spherical flow.

23. A pre-compression gas-dehydration system according to claim 22 wherein said inner screen and said outer screen are spherical so that said desiccant media is spherical shaped; and wherein each of said first desiccant bed adsorption unit and said second desiccant bed adsorption unit further comprises a solid segment divider that extends between the continuous side of said container and said inner screen thereby forming a first zone and a second zone of said desiccant media positioned within said container.

24. A pre-compression gas-dehydration system according to claim 23 wherein said container is provided with at least one sealable inlet port.

25. A pre-compression gas-dehydration system according to claim 23 wherein the continuous side of said container and said outer screen are spaced apart to form a gap zone between the exterior surface of said spherical shaped desiccant media and the continuous side of said container.

26. A pre-compression gas-dehydration system according to claim 13 wherein said desiccant media is selected from the group consisting of activated aluminum trioxide ($Al_2O_3$), molecular sieve, silica gel, lithium chloride (LiCl) and combinations thereof.

27. A pre-compression gas-dehydration system according to claim 13 wherein said desiccant media is aluminum trioxide and silica gel.

28. A pre-compression gas-dehydration system according to claim 13 further comprising a means for controlling the operation of said first valve and said second valve.

29. A pre-compression gas-dehydration system according to claim 28 wherein said means for controlling the operation of said first valve and said second valve comprises a computer having a central processor which can be programmed to operate the pre-compression gas-dehydration system automatically;

a first solenoid mechanically coupled to said first valve;

a second solenoid mechanically coupled to said second valve;

a first sensor electrically connected to said first desiccant bed adsorption unit and to said first solenoid; and a second sensor electrically connected to said second desiccant bed adsorption unit and to said second solenoid.

30. A pre-compression gas-dehydration system according to claim 29 wherein each of said first sensor and said second sensor is a moisture sensor.

31. A pre-compression gas-dehydration system according to claim 29 wherein each of said first sensor and said second sensor is a temperature sensor.

32. A pre-compression gas-dehydration system according to claim 13 further comprising a dedicated heater positioned within the center chamber defined by said inner screen to improve the rate of heat transfer to said desiccant media during regeneration.

* * * * *